US012747395B2

(12) United States Patent
Guggilla et al.

(10) Patent No.: US 12,747,395 B2
(45) Date of Patent: Sep. 29, 2026

(54) SYSTEMS AND METHODS FOR CATALYTIC CRACKING OF NAPHTHA WITH CO-FEED OF MIXED WASTE PLASTIC OIL TO PRODUCE LIGHT OLEFINS

(71) Applicant: SABIC Global Technologies B.V., Bergen OP Zoom (NL)

(72) Inventors: Vidya Sagar Guggilla, Bangalore (IN); Rajitha Vuppula, Bangalore (IN); Christoph Dittrich, Geleen (NL); B.V. Venugopal, Bangalore (IN); Ahmed S. Al-Zenaidi, Riyadh (SA)

(73) Assignee: SABIC Global Technologies B.V., Bergen OP Zoom (NL)

( * ) Notice: Subject to any disclaimer, the term of this patent is extended or adjusted under 35 U.S.C. 154(b) by 205 days.

(21) Appl. No.: 18/717,277

(22) PCT Filed: Dec. 15, 2022

(86) PCT No.: PCT/IB2022/062306

§ 371 (c)(1),
(2) Date: Jun. 6, 2024

(87) PCT Pub. No.: WO2023/111944

PCT Pub. Date: Jun. 22, 2023

(65) Prior Publication Data

US 2024/0417625 A1 Dec. 19, 2024

Related U.S. Application Data

(60) Provisional application No. 63/265,420, filed on Dec. 15, 2021, provisional application No. 63/265,415, filed on Dec. 15, 2021.

(51) Int. Cl.

| | |
|---|---|
| ***C10G 1/00*** | (2006.01) |
| ***B01J 29/40*** | (2006.01) |

(Continued)

(52) U.S. Cl.

CPC .............. *C10G 1/002* (2013.01); *B01J 29/40* (2013.01); *B01J 35/40* (2024.01); *C10G 1/10* (2013.01);

(Continued)

(58) Field of Classification Search

CPC ........ C10G 1/002; C10G 1/10; C10G 11/187; C10G 55/06; C10G 69/04; C10G 2300/10;

(Continued)

(56) References Cited

U.S. PATENT DOCUMENTS

| | | | |
|---|---|---|---|
| 5,364,995 | A | 11/1994 | Kirkwood et al. |
| 8,685,232 | B2 | 4/2014 | Mandal et al. |

(Continued)

FOREIGN PATENT DOCUMENTS

| | | | |
|---|---|---|---|
| EP | 3484980 | A1 | 5/2019 |
| WO | 2017/109640 | | 6/2017 |

(Continued)

OTHER PUBLICATIONS

International Search Report for international application No. PCT/IB2022/062306, mailed on Mar. 17, 2023.

(Continued)

*Primary Examiner* — Kyle Armstrong

(74) *Attorney, Agent, or Firm* — Womble Bond Dickinson (US) LLP

(57) ABSTRACT

The disclosure provides processes for fluid catalytic cracking of feed streams including hydrocarbons and varying amounts of mixed waste plastic oil to produce valuable petroleum products, such as light olefins. The process generally includes providing a waste plastic pyrolysis oil; passing the waste plastic pyrolysis oil through at least one guard bed configured to adsorb chlorine components; providing a hydrocarbon stream; combining the hydrocarbon (Continued)

stream with the waste plastic pyrolysis oil to provide a combined feed stream; and feeding the combined feed stream, along with steam, to a fluid catalytic cracking unit.

20 Claims, 2 Drawing Sheets

(51) Int. Cl.

| | |
|---|---|
| ***B01J 35/40*** | (2024.01) |
| ***C10G 1/10*** | (2006.01) |
| ***C10G 11/18*** | (2006.01) |
| ***C10G 55/06*** | (2006.01) |
| ***C10G 69/04*** | (2006.01) |

(52) U.S. Cl.

CPC ............ *C10G 11/187* (2013.01); *C10G 55/06* (2013.01); *C10G 69/04* (2013.01); *B01J 2229/18* (2013.01); *C10G 2300/10* (2013.01); *C10G 2300/1003* (2013.01); *C10G 2300/1044* (2013.01); *C10G 2300/201* (2013.01); *C10G 2300/301* (2013.01); *C10G 2300/4006* (2013.01); *C10G 2300/4025* (2013.01); *C10G 2300/70* (2013.01); *C10G 2300/807* (2013.01); *C10G 2400/20* (2013.01); *C10G 2400/30* (2013.01)

(58) Field of Classification Search

CPC .... C10G 2300/1003; C10G 2300/1044; C10G 2300/201; C10G 2300/301; C10G 2300/4006; C10G 2300/4025; C10G 2300/70; C10G 2300/807; C10G 2400/20; C10G 2400/30; B01J 35/40; B01J 29/40; B01J 2229/18

See application file for complete search history.

(56) References Cited

U.S. PATENT DOCUMENTS

| | | | | |
|---|---|---|---|---|
| 8,895,790 | B2 * | 11/2014 | Narayanaswamy | B01J 29/80 502/67 |
| 9,212,318 | B2 * | 12/2015 | Narayanaswamy | C10G 1/10 |
| 9,428,695 | B2 * | 8/2016 | Narayanaswamy | C10G 69/04 |
| 9,447,332 | B2 * | 9/2016 | Narayanaswamy | B01J 8/1836 |
| 10,442,997 | B2 | 10/2019 | Narayanaswamy et al. | |
| 2016/0264885 | A1 | 9/2016 | Narayanaswamy et al. | |
| 2020/0071623 | A1 | 3/2020 | Chinthala et al. | |
| 2020/0369966 | A1 | 11/2020 | Bitting et al. | |
| 2021/0130262 | A1 | 5/2021 | Wu et al. | |

FOREIGN PATENT DOCUMENTS

| | | |
|---|---|---|
| WO | 2020/152319 | 7/2020 |
| WO | 2020/242912 | 5/2021 |
| WO | 2021/087062 | 5/2021 |
| WO | 2021/105326 | 6/2021 |
| WO | 2021/204821 | 10/2021 |

OTHER PUBLICATIONS

Arandes et al: “Effect of HZSM-5 catalyst addition on the cracking of polyolefin pyrolysis waxes under FCC conditions”, Chemical Engeneering Journal, Elsevier, Amsterdam, NL, vol. 132, No. 1-3, Jun. 7, 2007 (Jun. 7, 2007), pp. 17-26.

* cited by examiner

SYSTEMS AND METHODS FOR CATALYTIC CRACKING OF NAPHTHA WITH CO-FEED OF MIXED WASTE PLASTIC OIL TO PRODUCE LIGHT OLEFINS

CROSS-REFERENCE TO RELATED APPLICATIONS

This application is a U.S. National Phase Under 35 U.S.C. § 371 of International Application No. PCT/IB2022/062306, titled "SYSTEMS AND METHODS FOR CATALYTIC CRACKING OF NAPHTHA WITH CO-FEED OF MIXED WASTE PLASTIC OIL TO PRODUCE LIGHT OLEFINS," filed Dec. 15, 2022, which claims the benefit of and priority to U.S. Provisional Application No. 63/265,415, filed on Dec. 15, 2021, and U.S. Provisional Application No. 63/265,420, filed on Dec. 15, 2021, all of which are incorporated herein by reference in their entireties.

TECHNICAL FIELD

The present disclosure generally relates to a process for producing light olefins from a combined hydrocarbon stream and mixed waste plastic pyrolysis oil using a catalytic cracking process. More specifically, the catalytic cracking process uses a modified HZSM-5 catalyst.

BACKGROUND

Globally, the production of plastic has increased steadily in the last decades. Recycling routes are an option to minimize plastic waste, while producing valuable petroleum products. However, the use of 100% mixed waste plastic pyrolysis oil in catalytic cracking processes has limitations due to high amounts of coke formation in the feed nozzles during preheating of the feed. Further, the formation of heavier products (e.g., fuel oil and tar) is high with 100% waste plastic oil as a cracker feed. Integration of mixed waste plastic pyrolysis oils into refinery fluid catalytic cracking unit feed streams has been previously investigated. Catalytic cracking of a pyrolysis oil derived from biomass-containing material has also been previously investigated. However, the majority of products produced by such processes include less valuable naphtha range components, such as products having five or more carbon atoms (C5+ products).

SUMMARY

It is presently recognized that different process conditions, different equipment, and/or changes in the cracking catalyst or catalyst composition may be made to achieve more valuable, light olefin yields for mixed waste plastic oil blended feeds, which are comparable to yields for vacuum gas oil or hydrotreated light oil feeds. Further, the major products produced in such integrated processes are restricted to naphtha range components (i.e., C5+ products). It is presently recognized that it is desirable to provide processes for producing light olefins from naphtha/waste plastic oil blends using specifically selected catalysts for catalytic cracking processes.

Provided herein are embodiments of a process and a system for producing light olefins and aromatics from a feed stream. Embodiments of the process generally include catalytic cracking of a feed stream having waste plastic pyrolysis oil and hydrocarbons. Advantageously, when performed on a feed stream having a waste plastic pyrolysis oil and a hydrocarbon blend including up to about 20% by weight of the waste plastic pyrolysis oil, the disclosed process may achieve similar light olefin production to that obtained for a hydrocarbon feed alone.

Accordingly, embodiments disclosed herein include methods for producing light olefins and aromatics. One such method includes providing a waste plastic pyrolysis oil having a first boiling point ranging from about 30 °C to about 250 °C, passing the waste plastic pyrolysis oil through at least one guard bed configured to adsorb chlorine components when present in the waste plastic pyrolysis oil, providing a hydrocarbon stream having a second boiling point ranging from about 30 °C to about 250 °C, and combining the hydrocarbon stream with the waste plastic pyrolysis oil to provide a combined feed stream. The method further includes the step of feeding the combined feed stream, along with steam, to a fluid catalytic cracking unit containing a catalytic cracking catalyst to yield a hydrocarbon product stream including a mixture of gaseous C1-C4 olefins and liquid C5 and C5+ hydrocarbons. The catalytic cracking catalyst includes a ZSM-5 zeolite (Zeolite Socony Mobil-5).

In some embodiments, the method can further include passing the waste plastic pyrolysis oil through at least one additional guard bed configured to adsorb one or more of silicon, fluorine, bromine, phosphorus, or sulphur containing components when present in the waste plastic pyrolysis oil.

In some embodiments, the HZSM-5 zeolite can be phosphorus modified. In some embodiments, the HZSM-5 zeolite may include about 5 weight percent (wt. %) of $P_2O_5$ and may have a silica-to-alumina ratio (SAR) ranging from about 27 to about 50. In some embodiments, the HZSM-5 may have a SAR of about 30. In some embodiments, the catalytic cracking catalyst can further include clay and alumina. In some embodiments, the catalytic cracking catalyst may include a form of spray dried microspheres having an average particle size ranging from about 80 to about 110 microns.

In some embodiments, the combined feed stream can include at least about 1 wt. % of the waste plastic pyrolysis oil. In some embodiments, the combined feed stream can include up to about 90 wt. % of the waste plastic pyrolysis oil. In some embodiments, the combined feed stream can include about 2 wt. % to about 20 wt. % of the waste plastic pyrolysis oil. In some embodiments, the combined feed stream may include from about 10 wt. % to about 20 wt. % of the waste plastic pyrolysis oil.

In some embodiments, the waste plastic pyrolysis oil, after passing through the at least one guard bed configured to adsorb the chlorine components, includes about 50 ppm or less of chlorine.

In some embodiments, the fluid catalytic cracking unit may be operated at a reaction temperature between about 600 °C and about 700 °C. In some embodiments, the fluid catalytic cracking unit may be operated at a reaction temperature of about 650 °C In some embodiments, a ratio of the steam to the waste plastic pyrolysis oil by weight may be ranging from about 0.1 to about 0.5.

In some embodiments, the hydrocarbon product stream may include at least about 50 wt. % of a mixture of ethylene, propylene, benzene, toluene, and xylene, based on a total weight of the hydrocarbon product stream. In some embodiments, the hydrocarbon product stream contains at least about 20 wt. % of a mixture of ethylene and propylene. In some embodiments, the hydrocarbon product stream may include from about 40 wt. % to about 50 wt. % of a mixture of ethylene and propylene. In some embodiments, product yields of ethylene and propylene of the hydrocarbon product stream may be substantially the same as or greater than those obtained by steam cracking an additional hydrocarbon stream that does not include the waste plastic pyrolysis oil. In some embodiments, the waste plastic pyrolysis oil has not been hydrotreated. In some embodiments, the waste plastic pyrolysis oil may be an untreated oil obtained from thermal decomposition of mixed plastic waste.

Additionally, embodiments disclosed herein include systems for producing light olefins and aromatics. One such system includes at least one guard bed configured to adsorb chlorine components from a waste plastic pyrolysis oil. The system includes a mixer configured to combine the waste pyrolysis oil with a hydrocarbon stream to provide a combined feed stream. The waste plastic pyrolysis oil includes a first boiling point ranging from about 30 °C to about 250 °C and the hydrocarbon stream includes a second boiling point ranging from about 30 °C to about 250 °C The system further includes a catalytic cracking unit configured to crack the combined feed stream with steam to yield a hydrocarbon product stream comprising a mixture of gaseous C1-C4 olefins and liquid C5 and C5+ hydrocarbons. The catalytic cracking unit includes a catalyst having a HZSM-5 zeolite.

These and other features, aspects, and advantages of the present disclosure will be apparent from a reading of the following detailed description together with the accompanying drawings, which are briefly described below. Moreover, it is to be understood that both the foregoing information and the following detailed description provide merely illustrative examples of various aspects and embodiments and are intended to provide an overview or framework for understanding the nature and character of the claimed aspects and embodiments. Accordingly, these and other objects, along with advantages and features of the present disclosure, will become apparent through reference to the following description and the accompanying drawings. Furthermore, it is to be understood that the features of the various embodiments described herein are not mutually exclusive and may exist in various combinations and permutations. For example, the present disclosure includes any combination of two, three, four or more features or elements set forth in this disclosure, regardless of whether such features or elements are expressly combined or otherwise recited in a specific example implementation described herein.

BRIEF DESCRIPTION OF THE DRAWINGS

Having thus described aspects of the disclosure in the foregoing general terms, reference will now be made to the accompanying drawings, which are not necessarily drawn to scale. The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than may be necessary for a fundamental understanding of the embodiments discussed herein and the various ways in which they may be practiced.

Figure 1:
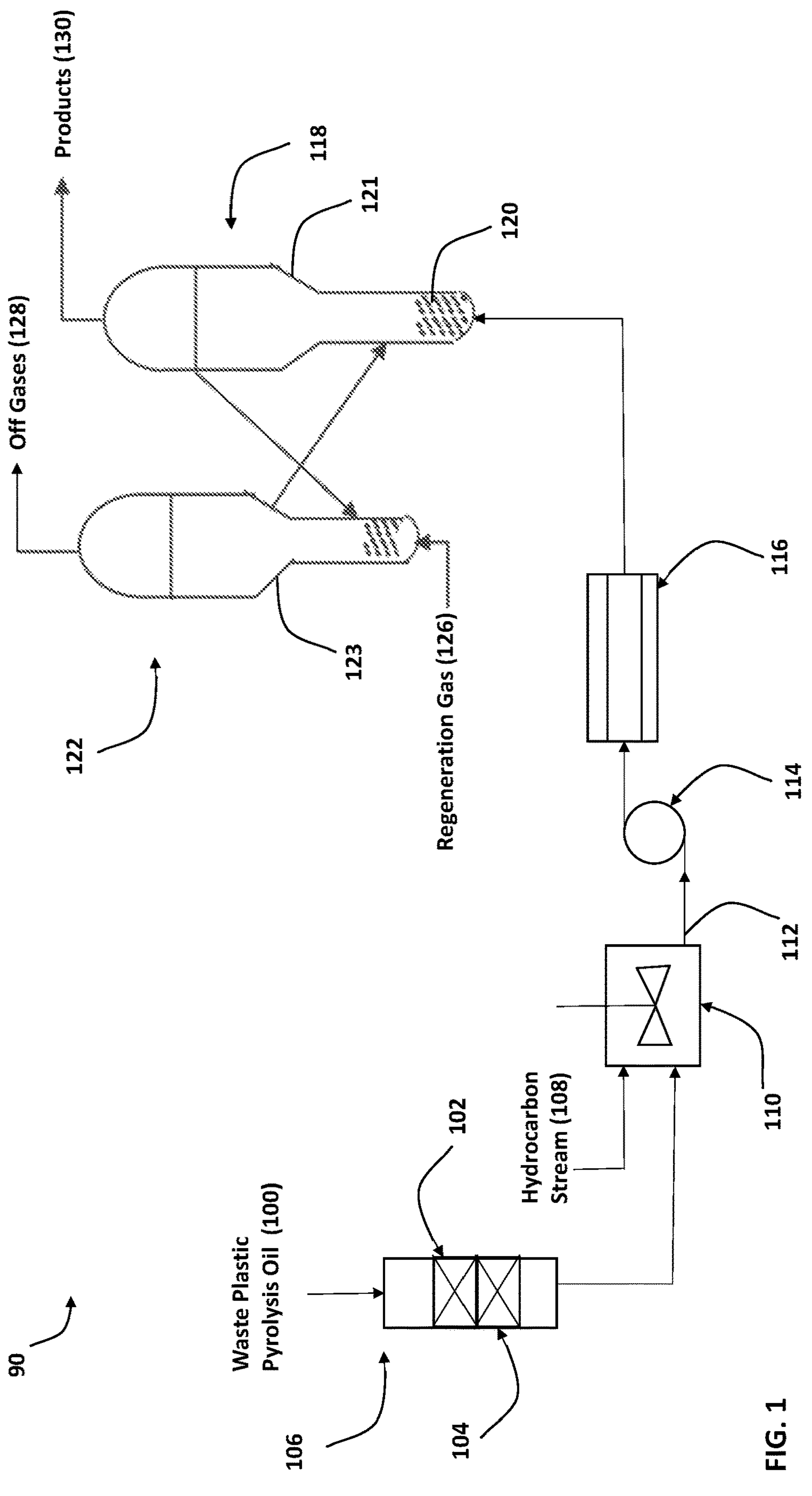

FIG. 1 shows a schematic diagram of a system for producing light olefins and aromatics according to an embodiment of the disclosure.

Figure 2:
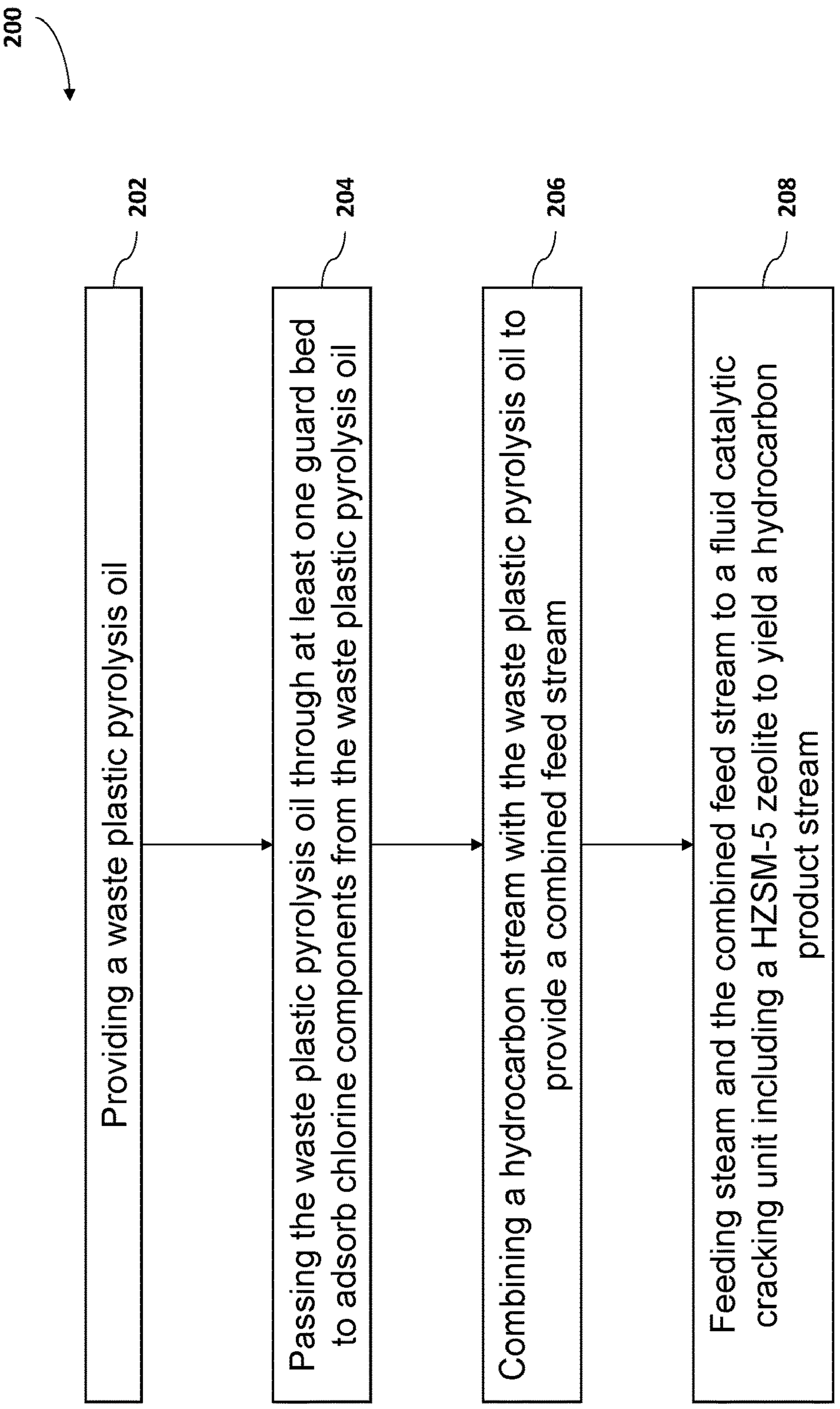

FIG. 2 shows a diagrammatic representation of a method of producing light olefins and aromatics using a combined feed stream according to an embodiment of the disclosure.

DETAILED DESCRIPTION

The present disclosure will now be described more fully hereinafter with reference to example embodiments thereof. These example embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements.

Although specific terms are employed, the terms are used in a descriptive sense only and not for purposes of limitation. Embodiments of systems and methods have been described in considerable detail with specific reference to the illustrated embodiments. However, it will be apparent that various modifications and changes can be made within the spirit and scope of the embodiments of systems and methods as described in this specification, and such modifications and changes are to be considered equivalents and part of this disclosure.

The following includes definitions of various terms and phrases used throughout this specification.

The use of the words "a" or "an" when used in conjunction with the term "comprising," "including," "containing," or "having" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The process of the present disclosure can "comprise," "consist essentially of," or "consist of" particular ingredients, components, compositions, etc., disclosed throughout the specification.

The terms "about" or "approximately" are defined as being close to as understood by one of ordinary skill in the art. In one non-limiting embodiment, the terms are defined to be within 10%, preferably, within 5%, more preferably, within 1%, and most preferably, within 0.5%.

The terms "wt. %", "vol. %" or "mol. %" refer to a weight, volume, or molar percentage of a component, respectively, based on the total weight, the total volume, or the total moles of material that includes the component. In a non-limiting example, 10 moles of component in 100 moles of the material is 10 mol. % of component.

The term "substantially" and its variations are defined to include ranges within 10%, within 5%, within 1%, or within 0.5%.

The present disclosure is generally directed to embodiments of systems and processes for producing light olefins and aromatics from a feed stream containing waste plastic pyrolysis oil and hydrocarbons under steam fluid catalytic cracking conditions. In some embodiments, this utilization or recycling of the waste plastic pyrolysis oil may benefit operating costs of the catalytic cracking system as well as the environment. Moreover, hydrotreatment of the waste plastic pyrolysis oil may be avoided to simplify or reduce costs of the disclosed systems and processes.

One such embodiment of the present disclosure includes providing a waste plastic pyrolysis oil having a first boiling point ranging from about 30 °C to about 250 °C, passing the waste plastic pyrolysis oil through at least one guard bed configured to adsorb chlorine components when present in the waste plastic pyrolysis oil, providing a hydrocarbon stream having a second boiling point ranging from about 30 °C to about 250 °C, and combining the hydrocarbon stream with the waste plastic pyrolysis oil to provide a combined feed stream. This method further includes feeding the combined feed stream, along with steam, to a fluid catalytic cracking unit containing a catalytic cracking catalyst to yield a hydrocarbon product stream including a mixture of gaseous C1-C4 olefins and liquid C5 and C5+ hydrocarbons. The catalytic cracking catalyst includes a ZSM-5 zeolite (Zeolite Socony Mobil-5). In certain embodiments, the catalytic cracking catalyst is a phosphate modified ZSM-5 zeolite. In certain embodiments, the catalytic cracking catalyst is a ZSM-5 zeolite containing a rare earth element. In certain embodiments, the catalytic cracking catalyst is a ZSM-5 zeolite with a silicon to aluminum ratio of between about 25 to about 50. In certain embodiments, the catalytic cracking catalyst is a ZSM-5 zeolite with a silicon to aluminum ratio of between about 25 to about 35. In certain embodiments, the catalytic cracking catalyst is a ZSM-5 zeolite with a silicon to aluminum ratio of about 30. These and other features of the process are further described herein below.

Embodiments of the disclosed system may be performed using any suitable catalytic cracking unit. A schematic illustration of a catalytic cracking system 90 for producing light olefins and aromatics according to one non-limiting embodiment is provided in FIG. 1. With reference to FIG. 1, the process may include providing a waste plastic pyrolysis oil 100, for example an untreated ("raw") oil obtained from the thermal decomposition of mixed plastic waste. In some embodiments, the waste plastic pyrolysis oil 100 is produced by pyrolysis of mixed waste plastics and/or rubber oil. In some embodiments, the waste plastic pyrolysis oil 100 has been treated, e.g., to remove one or more contaminants. In some embodiments, the waste plastic pyrolysis oil 100 has not been treated. In some embodiments, the waste plastic pyrolysis oil 100 has not been hydrotreated.

The boiling range of suitable waste plastic pyrolysis oils may vary. For example, a suitable waste plastic pyrolysis oil may have a boiling point (e.g., first boiling point) ranging from about 30 °C to about 450 °C. The upper limit of the boiling point range may be referred to as a "final boiling point" or "FBP", meaning that substantially all of the waste plastic pyrolysis oil is volatilized below or at that temperature. In some embodiments, the FBP is 250 °C.

The process can include passing the waste plastic pyrolysis oil 100 through at least one guard bed 102 configured to adsorb chlorine components which may be present in the waste plastic pyrolysis oil 100. For example, chlorine components, present as organic or inorganic chloride, may be present in the waste plastic pyrolysis oil as a result of pyrolyzing waste plastics including chlorinated polymers such as polyvinyl chloride. It is generally desirable to remove such chlorine components prior to catalytic cracking. The at least one guard bed 102 may be contained within an outer structure 106 or shell. Any suitable material or adsorbent for adsorption of chlorine components may be utilized within the guard bed 102. In some embodiments, after passing through the guard bed 102, the waste plastic pyrolysis oil 100 contains about 50 ppm or less of chlorine components (e.g., chlorine or inorganic chloride, such as HCl), such as about 50, about 40, about 30, about 20, about 15, about 10, about 9, about 8, about 7, about 6, about 5, about 4, about 3, about 2, about 1, about 0.1, about 0.01, about 0.001, or even about 0 ppm of chlorine components.

In some embodiments, the at least one guard bed 102 is further configured to adsorb one or more of silicon, fluorine, bromine, phosphorus, or sulphur containing components which may be present in the waste plastic pyrolysis oil 100. In some embodiments, the at least one guard bed 102 is further configured to adsorb one or more of arsenic, vanadium, or lead containing components which may be present in the waste plastic pyrolysis oil 100. In some embodiments, the at least one guard bed guard bed 102 includes a single adsorption unit within the outer structure 106. In some embodiments, the at least one guard bed 102 includes multiple adsorption units positioned within the outer structure 106, such as in series relative to flow of the waste plastic pyrolysis oil 100. In such embodiments, the process may include passing the waste plastic pyrolysis oil 100 through a further guard bed 104, configured to adsorb one or more of silicon, fluorine, bromine, phosphorus, or sulphur containing components which may be present in the waste plastic pyrolysis oil 100. In some embodiments, the system does not include any guard bed 102.

Following passage through the at least one guard bed 102, the waste plastic pyrolysis oil 100 is combined with a hydrocarbon stream 108 to provide a combined feed stream 112. The combining is generally performed in a mixing apparatus 110. The mixing apparatus 110 may be any suitable vessel for integrating, stirring, agitating, or otherwise combining the hydrocarbon stream 108 and the waste plastic pyrolysis oil 100 to provide the combined feed stream 112. The combined feed stream 112 includes a homogeneous mixture of the hydrocarbon stream 108 and the waste plastic pyrolysis oil 100, in certain embodiments.

Suitable embodiments of the hydrocarbon stream 108 may include, for example, paraffins and isomeric paraffins, olefins, and/or aromatics. The boiling range of the suitable hydrocarbon streams 108 may vary. For example, a suitable hydrocarbon stream 108 may have a boiling point (e.g., second boiling point) ranging from about 30 °C to about 200 °C. In some embodiments, the hydrocarbon stream is full range naphtha (FRN). As such, the hydrocarbon stream 108 of certain embodiments may have a same or similar boiling point as the waste plastic pyrolysis oil 100.

The amount of waste plastic pyrolysis oil 100 in the combined feed stream 112 may vary. Generally, the combined feed stream 112 includes at least about 2 wt. % of the waste plastic pyrolysis oil 100. In some embodiments, the combined feed stream 112 includes up to about 90 wt. % of the waste plastic pyrolysis oil 100. In some embodiments, the combined feed stream 112 includes from about 1 to about 90 wt. % of the waste plastic pyrolysis oil 100. In some embodiments, the combined feed stream 112 includes from about 10 to about 20 wt. % of the waste plastic pyrolysis oil 100. In some embodiments, the combined feed stream 112 includes about 10 wt. % of the waste plastic pyrolysis oil 100. In some embodiments, the combined feed stream 112 includes about 20 wt. % of the waste plastic pyrolysis oil 100.

In some embodiments, the combined feed stream 112 is delivered to a pump 114 configured to feed the combined feed stream 112 to the fluid catalytic cracking unit 118. In some embodiments, the combined feed stream 112 enters a heat exchanger 116 prior to feeding to the fluid catalytic cracking unit 118.

The fluid catalytic cracking unit 118 includes a catalytic cracking catalyst 120 disposed within a vessel 121 or shell. In some embodiments, the catalytic cracking catalyst 120 includes a zeolite material. In some embodiments, the catalytic cracking catalyst 120 may include the hydrogen form of zeolite ZSM-5 (HZSM-5). In some embodiments, the HZSM-5 may be phosphorus modified. In some embodiments, the phosphorus modified HZSM-5 may include about 5 wt. % of $P_2O_5$. In some embodiments, the phosphorus modified HZSM-5 may have a silica-to-alumina ($SiO_2$/A1203; SAR) molar ratio ranging from about 27 to about 50. In some embodiments, the SAR molar ratio is about 30. In some embodiments, the catalytic cracking catalyst 120 may further include one or more support materials. For example, in some embodiments, the catalytic cracking catalyst 120 may further include clay and alumina. In some embodiments, the catalytic cracking catalyst 120 may be in the form of spray dried microspheres having an average particle size ranging from about 80 to about 110 microns. In some embodiments, the catalytic cracking catalyst 120 may have an average bulk density of about 0.8 g/ml and an attrition index (as determined under ASTM-D5757) of less than about 10 wt. %.

The temperature at which the fluid catalytic cracking unit 118 is operated may vary. In some embodiments, the fluid catalytic cracking unit 118 may be operated at a reaction temperature between about 600 °C and about 700 °C. In some embodiments, the fluid catalytic cracking unit 118 is operated at a reaction temperature of about 60 0°C. In some embodiments, the fluid catalytic cracking unit 118 is operated at a reaction temperature of about 650 °C.

Embodiments of the process generally include feeding the combined feed stream 112 along with steam to the fluid catalytic cracking unit 118. In certain embodiments, the combined feed stream 112 may therefore undergo steam cracking within the fluid catalytic cracking unit 118. The quantity of steam provided may vary and may be expressed as a ratio by weight of steam to the waste plastic pyrolysis oil 100. In some embodiments, the ratio of the steam to the waste plastic pyrolysis oil 100 may range from about 0.1 to about 0.5, or from about 0.25 to about 0.5. The rate at which the combined feed stream 112 and steam are fed to the fluid catalytic cracking unit 118, expressed as weight hourly space velocity, may vary. For example, in some embodiments, the weight hourly space velocity may be from about 1 to about 6 $h^{-1}$.

In some embodiments, the process may further include feeding a portion of the catalyst 120 to a regenerator 122 having a vessel 123 or shell. A regeneration gas 126 is introduced into the vessel 123 to regenerate the catalyst 120, which is fed back to fluid catalytic cracking unit 118. Off gases 128 may be removed from the regenerator 122 as fresh regeneration gas 126 is provided.

The embodiments of the disclosed process yield a hydrocarbon product stream 130 from the fluid catalytic cracking unit 118. The composition of the hydrocarbon product stream may vary depending on the feed components and cracking conditions, but generally includes a mixture of gaseous C1-C4 hydrocarbons, liquid C5 hydrocarbons, and liquid C5+ hydrocarbons. Gaseous C1-C4 hydrocarbons of the hydrocarbon product stream 130 include olefins such as ethylene, propylene, and isomeric butylenes, as well as alkanes such as methane, ethane, propane, and the isomeric butanes (e.g., normal and isobutene). Liquid C5 and liquid C5+ hydrocarbons of the hydrocarbon product stream 130 may include aromatics, such as benzene, toluene, and xylene. In some embodiments, the hydrocarbon product stream 130 includes at least about 50 percent by weight of a mixture of ethylene, propylene, benzene, toluene, and xylene, based on the total weight of the hydrocarbon product stream 130. In some embodiments, the hydrocarbon product stream 130 includes from about 55 to about 60, or from about 56 to about 57 percent by weight of a mixture of ethylene, propylene, benzene, toluene, and xylene, based on the total weight of the hydrocarbon product stream.

To facilitate further understanding, FIG. 2 is diagrammatic representation of a method 200 of producing light olefins and aromatics using a combined feed stream that includes waste plastic pyrolysis oil. In some embodiments, the method 200 may generally correspond to certain embodiments of the elements and processes discussed with reference to the catalytic cracking system 90 of FIG. 1. The method includes the step 202 of providing a waste plastic pyrolysis oil. The method includes the step 204 of passing the waste plastic pyrolysis oil through at least one guard bed to adsorb chlorine components from the waste plastic pyrolysis oil. In other embodiments, the method may further include passing the waste plastic pyrolysis oil through at least one additional guard bed to adsorb one or more of silicon, fluorine, bromine, phosphorus, or sulphur containing components from the waste plastic pyrolysis oil. The method includes the step 206 of combining a hydrocarbon stream with the waste plastic pyrolysis oil to provide a combined feed stream. The method includes the step 208 of feeding steam and the combined feed stream to a fluid catalytic cracking unit including a HZSM-5 zeolite to yield a hydrocarbon product stream. The hydrocarbon product stream includes light olefins and aromatics, such as a mixture of gaseous C1-C4 olefins and liquid C5 and C5+ hydrocarbons.

As described above, the embodiments of the disclosed process provide surprisingly high yields of ethylene and propylene from combined feed streams 112 including waste plastic pyrolysis oils 100 and hydrocarbon streams 108 (e.g., full range naphtha). In some embodiments, the hydrocarbon product stream 130 includes at least about 20 percent by weight of a mixture of ethylene and propylene. In some embodiments, the hydrocarbon product stream 130 includes from about 40 to about 50 percent by weight of a mixture of ethylene and propylene, such as from about 40, about 41, about 42, about 43, or about 44, to about 45, about 46, about 47, about 48, about 49, or about 50 percent by weight of a mixture of ethylene and propylene. In some embodiments, product yields of ethylene and propylene may be obtained that are substantially the same as, or even greater than, those obtained by steam cracking in a fluid catalytic cracking unit receiving a hydrocarbon stream which does not include the waste plastic pyrolysis oil 100. Accordingly, the presently disclosed process facilitates recycling of otherwise wasted materials to produce satisfactory yields of valuable hydrocarbon products. In some embodiments, the broadened acceptability of the waste plastic pyrolysis oil 100 as a component of the combined feed stream 112 also improves the material operating costs of the catalytic cracking system 90.

Many modifications and other implementations of the disclosure will come to mind to one skilled in the art to which this disclosure pertains having the benefit of the teachings presented in the foregoing descriptions and the associated figures. Therefore, it is to be understood that the disclosure is not to be limited to the specific implementations disclosed herein and that modifications and other implementations are intended to be included within the scope of the appended claims. Although specific terms are employed herein, they are used in a generic and descriptive sense only and not for purposes of limitation.

EXAMPLES

The following examples are put forth so as to provide those of ordinary skill in the art with a complete disclosure and description of how the compounds, compositions, articles, devices and/or methods claimed herein are made and evaluated and, therefore, are intended to be purely exemplary and are not intended to limit the disclosure. Efforts have been made to ensure accuracy with respect to numbers (e.g., amounts, temperature, etc.), but some errors and deviations should be accounted for There are numerous variations and combinations of reaction conditions, for example, component concentrations, desired solvents, solvent mixtures, temperatures, pressures and other reaction ranges and conditions that can be used to optimize the product purity and yield obtained from the described process. Only reasonable and routine experimentation will be required to optimize such process conditions.

Example 1. Preparation of Spray Dried Zeolite $P_2O_5$-HZSM-5 Catalyst (5 wt. % $P_2O_5$-HZSM-5; SAR of 30)

Commercial ZSM-5 (Zeolyst, NH4 form; CBV3024E; Si/Al=27) was calcined at 650 °C at a heating rate of 3 °C/min with a hold time of 5 hours to provide the hydrogen (H-form) of ZSM-5 (H-ZSM-5). The HZSM-5 catalyst (600 g; on a dry basis) was made into a slurry with 1100 g of demineralized water. To the slurry was added a solution of mono ammonium phosphate (121.6 g) in demineralized water (360 g), followed by mixing. The resulting zeolite phosphate slurry (slurry A) was stabilized at room temperature under continuous stirring for about 3 hours. Dispersal P2 grade alumina (660 g on dry basis) was made into a slurry (slurry B) with 11466.7 g of demineralized water and peptized with nitric acid (29.7 g on dry basis), keeping the slurry under vigorous stirring for 3 hours. Kaolin-100 clay (420 g on dry basis) was made into a slurry (slurry C) with demineralized water (1260 g) and the slurry was vigorously stirred for 3 hours. A solution of mono ammonium phosphate (MAP; 97.3 g) was prepared in demineralized water (292 g) under vigorous stirring for 1 hour. The prepared alumina slurry (slurry B), the clay slurry (slurry C) and the MAP solution were mixed under vigorous stirring. The pH was maintained above 3.5 The zeolite phosphate slurry (slurry A) was added to the mixed slurry under continuous stirring and the blend was stirred for about 1 hour at 50 °C. Aluminum chlorohydrate (28 g) was added to the mixed slurry. The resulting slurry was spray dried to provide microsphere particles having an average particle size (APS) of 80-110 microns. The spray dried product was calcined at 650 °C for 1 hour. The catalyst particles had an average bulk density of 0.8 g/ml and an attrition index (determined according to ASTM-D5757) of <10 wt. %. The resulting catalyst was equilibrated in a 100% steam atmosphere at 750 °C for 12 hours.

Example 2. Catalytic Cracking of Full Range Naphtha and Mixed Waste Plastic Oil Blends to Light Olefins Over Spray Dried Zeolite $P_2O_5$-HZSM-5 Catalyst Catalytic cracking of full range naphtha, mixed waste plastic oil (FBP: 250), and blends thereof to produce light olefins was performed over the catalyst produced via Example 1. The physical properties and chemical composition of feed stocks of the full range naphtha (FRN) and mixed waste plastic oil are provided in Table 1. The catalytic cracking was performed in a fixed bed micro reactor having an internal diameter of 12 mm. The product yields were determined using full range naphtha and mixed waste plastic oil at a reactor temperature of 600-650 °C using a steam/oil ratio of 0.25 to 0.5, by weight and a weight hourly space velocity of ~1.0-6.0 $h^{-1}$. The gaseous products were measured volumetrically using a wet gas flow meter and product compositions were analyzed by on-line gas chromatography. Condensed liquid products were weighed using an analytical balance, and product composition was analyzed by off-line gas chromatography.

TABLE 1

The physical properties of feed stocks

| Property | Unit | Full Range Naphtha (FRN) | Pyrolysis Oil |
|---|---|---|---|
| Density (20° C.) kg/m$^3$ | kg/m$^3$ | 680 | 687 |
| Boiling Range | | | |
| Initial Boiling Point | ° C. | 30 | 30 |
| Final Boiling Point (FBP) | ° C. | 200 | 150 |
| Chemical Composition | | | |
| Paraffins | wt. % | 30.9 | 17.3 |
| Iso-paraffins | wt. % | 39.5 | 16.7 |
| Olefins | wt. % | 1.3 | 24.4 |
| Naphthenes | wt. % | 24.6 | 28.9 |
| Aromatics | wt. % | 3.7 | 11.2 |
| Total Nitrogen | ppm | 5 | 1800 |
| Total Sulfur | ppm | 50 | 490 |
| Total Oxygen | ppm | 0 | 5700 |
| Total Chlorine | ppm | 0 | 11.4 |

Example 2A. Catalytic Cracking of Full Range Naphtha (FRN)

Catalytic cracking was first conducted with full range naphtha (FRN) alone at a temperature of 650 °C. The conversion yield and product distribution are provided in Table 2 for three separate runs.

TABLE 2

Conversion and product yields distribution over full range naphtha

| Experiment No. | Run 1 | Run 2 | Run 3 |
|---|---|---|---|
| Conversion and Product Yields, wt. % | | | |
| Conversion ($H_2$ + C1-C4 gases + coke) | 72.37 | 71.70 | 72.56 |
| HVCs (E + P + Benzene/Toluene/Xylene (BTX)) | 56.97 | 56.77 | 56.83 |
| $C_5$ and $C_5$+ without BTX | 17.43 | 17.97 | 16.81 |
| LPG yield (propane + normal butane and isobutane) | 6.58 | 6.35 | 6.75 |
| Dry gases ($H_2$ + CO + $CO_2$ + $CH_4$) | 7.24 | 7.19 | 7.65 |
| Propylene/Ethylene | 1.06 | 1.09 | 1.05 |
| CO | 0.13 | 0.13 | 0.13 |
| $CO_2$ | 0.00 | 0.00 | 0.00 |
| Hydrogen | 0.67 | 0.66 | 0.69 |
| Methane | 6.44 | 6.40 | 6.82 |

TABLE 2-continued

| Conversion and product yields distribution over full range naphtha | | | |
|---|---|---|---|
| Experiment No. | Run 1 | Run 2 | Run 3 |
| Ethane | 6.54 | 6.36 | 6.77 |
| Ethylene | 22.70 | 22.25 | 22.51 |
| Propane | 5.11 | 4.88 | 5.14 |
| Propylene | 24.07 | 24.19 | 23.69 |
| i-Butane | 0.52 | 0.50 | 0.55 |
| n-Butane | 0.95 | 0.97 | 1.06 |
| i-Butylene | 2.16 | 2.21 | 2.14 |
| n-Butylene | 3.08 | 3.15 | 3.04 |
| Total Butylenes | 5.24 | 5.36 | 5.19 |
| Benzene/Toluene/Xylene (BTX) yield | | | |
| Benzene | 2.70 | 2.78 | 2.91 |
| Toluene | 4.64 | 4.67 | 4.82 |
| Xylene | 2.85 | 2.88 | 2.89 |
| Total BTX | 10.19 | 10.33 | 10.63 |

Example 2B. Catalytic Cracking of Waste Plastic Pyrolysis Oil

Catalytic cracking of pyrolysis oil alone (produced by pyrolysis of mixed waste plastics/rubber oil; FBP of 250 °C) was conducted at a temperature of 650 °C using a steam/oil ratio of 0.25 and a weight hourly space velocity of 6 $h^{-1}$. The conversion yield and product distribution are provided in Table 3.

TABLE 3

| Conversion and product yields distribution for mixed waste plastic pyrolysis oil | |
|---|---|
| Conversion and Product Yields, wt. % | |
| Conversion ($H_2$ + $C_1$-$C_4$ gases + coke) | 69.73 |
| HVCs (E + P + $C_4$ =+ BTX) | 56.30 |
| $C_5$ and $C_5$+ without BTX | 22.43 |
| LPG yield (propane + normal butane and isobutane) | 3.50 |
| Dry gases ($H_2$ + CO + $CO_2$ + $CH_4$) | 5.45 |
| Propylene/Ethylene | 1.74 |
| CO | 0.44 |
| $CO_2$ | 0.00 |
| Hydrogen | 0.30 |
| Methane | 4.71 |
| Ethane | 4.55 |
| Ethylene | 15.99 |
| Propane | 2.39 |
| Propylene | 27.54 |
| i-Butane | 0.41 |
| n-Butane | 0.70 |
| i-Butylene | 3.09 |
| n-Butylene | 4.69 |
| Total Butylenes | 7.78 |
| Benzene/Toluene/Xylene (BTX) yield | |
| Benzene | 3.66 |
| Toluene | 6.09 |
| Xylene | 3.02 |
| Total BTX | 12.77 |

Example 2C. Catalytic Cracking of a 90:10 Full Range Naphtha and Waste Plastic Pyrolysis Oil Mixture Catalytic cracking of mixtures of pyrolysis oil was conducted in a similar manner as in Examples 2A and 2B using a mixture of 90% by weight of FRN and 10% by weight of waste plastic pyrolysis oil. The conversion yield and product distribution are provided in Table 4.

TABLE 4

| Conversion and product yields distribution for 90:10 blended feed | |
|---|---|
| Conversion and Product Yields, wt. % | |
| Conversion ($H_2$ + $C_1$-$C_4$ gases + coke) | 71.67 |
| HVCs (E + P + $C_4$ =+ BTX) | 57.16 |
| $C_5$ and $C_5$+ without BTX | 17.94 |
| LPG yield (propane + normal butane and isobutane) | 6.13 |
| Dry gases ($H_2$ + CO + $CO_2$ + $CH_4$) | 6.87 |
| Propylene/Ethylene | 1.21 |
| CO | 0.17 |
| $CO_2$ | 0.00 |
| Hydrogen | 0.62 |
| Methane | 6.07 |
| Ethane | 6.04 |
| Ethylene | 21.19 |
| Propane | 4.43 |
| Propylene | 25.57 |
| i-Butane | 0.53 |
| n-Butane | 1.17 |
| i-Butylene | 2.42 |
| n-Butylene | 3.45 |
| Total Butylenes | 5.87 |
| Benzene/Toluene/Xylene (BTX) yield | |
| Benzene | 2.84 |
| Toluene | 4.76 |
| Xylene | 2.79 |
| Total BTX | 10.39 |

Example 2D. Catalytic Cracking of an 80:20 Full Range Naphtha and Waste Plastic Pyrolysis Oil Mixture Catalytic cracking of mixtures of pyrolysis oil was conducted as in Example 2C using a mixture of 80% by weight of FRN and 20% by weight of waste plastic pyrolysis oil. The conversion yield and product distribution are provided in Table 5.

TABLE 5

| Conversion and product yields distribution for 80:20 blended feed | |
|---|---|
| Conversion and Product Yields, wt. % | |
| Conversion ($H_2$ + $C_1$-$C_4$ gases + coke) | 70.08 |
| HVCs (E + P + $C_4$ =+ BTX) | 56.54 |
| $C_5$ and $C_5$+ without BTX | 18.98 |
| LPG yield (propane + normal butane and isobutane) | 5.66 |
| Dry gases ($H_2$ + CO + $CO_2$ + $CH_4$) | 6.96 |
| Propylene/Ethylene | 1.28 |
| CO | 0.20 |
| $CO_2$ | 0.00 |
| Hydrogen | 0.58 |
| Methane | 6.18 |
| Ethane | 5.92 |
| Ethylene | 20.07 |
| Propane | 4.01 |
| Propylene | 25.52 |
| i-Butane | 0.50 |
| n-Butane | 1.15 |
| i-Butylene | 2.44 |
| Conversion and Product Yields, wt. % | |
| n-Butylene | 3.50 |
| Total Butylenes | 5.9/5 |

TABLE 5-continued

| Conversion and product yields distribution for 80:20 blended feed | |
|---|---|
| Benzene/Toluene/Xylene (BTX) yield | |
| Benzene | 3.04 |
| Toluene | 5.11 |
| Xylene | 2.79 |
| Total BTX | 10.95 |

Example 3. Catalytic Cracking of Full Range Naphtha (FRN) and a 90:10 FRN/Waste Plastic Pyrolysis Oil Mixture Catalytic cracking of full range naphtha (FRN) and a 90:10 FRN/waste plastic pyrolysis oil mixture was conducted as in Examples 2A-2D, but using a temperature of 600 °C. The conversion and product yields at the lower reaction temperature are provided in Table 6.

TABLE 6

| Conversion and product yields distribution for FRN and blended feed at 600° C. | | |
|---|---|---|
| Feed composition | FRN | FRN (90 wt. %) + Mixed waste plastic oil (10 wt. %) |
| Conversion and Product Yields, wt. % | | |
| Conversion ($H_2$ + $C_1$-$C_4$ gases + coke) | 62.85 | 58.19 |
| HVCs (E + P + $C_4$ =+ BTX) | 44.77 | 43.35 |
| $C_5$ and $C_5$+ without BTX | 29.37 | 34.18 |
| LPG yield (propane + normal butane and isobutane) | 11.28 | 8.56 |
| Dry gases ($H_2$ + CO + $CO_2$ + $CH_4$) | 3.11 | 2.92 |
| Propylene/Ethylene | 1.28 | 1.57 |
| CO | 0.08 | 0.10 |
| $CO_2$ | 0.00 | 0.00 |
| Hydrogen | 0.46 | 0.39 |
| Methane | 2.56 | 2.42 |
| Ethane | 4.78 | 4.23 |
| Ethylene | 16.33 | 13.93 |
| Propane | 7.36 | 5.77 |
| Propylene | 20.67 | 21.80 |
| i-Butane | 1.26 | 0.82 |
| n-Butane | 2.66 | 1.97 |
| i-Butylene | 2.81 | 2.61 |
| n-Butylene | 3.89 | 4.14 |
| Total Butylenes | 6.69 | 6.76 |
| Benzene/Toluene/Xylene (BTX) yield | | |
| Benzene | 1.56 | 1.59 |
| Toluene | 3.34 | 3.29 |
| Xylene | 2.88 | 2.74 |
| Total BTX | 7.78 | 7.63 |

The results herein demonstrate that higher ethylene and propylene yields were achieved at a reaction temperature of 650° C. (Tables 1 and 4) as compared to 600 °C (Table 6). Further, an increase in coke yield with an increasing percentage of mixed waste plastic pyrolysis oil blend in the naphtha feed was observed. This increased coke yield further assists in heat management for the catalytic cracking process.

Other objects, features, and advantages of the disclosure will become apparent from the foregoing figures, detailed description, and examples. It should be understood, however, that the figures, detailed description, and examples, while indicating specific embodiments of the disclosure, are given by way of illustration only and are not meant to be limiting. Additionally, it is contemplated that changes and modifications within the spirit and scope of the disclosure will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

What is claimed is:

1. A process for producing light olefins and aromatics, the process comprising:

providing a waste plastic pyrolysis oil having a first boiling point ranging from about 30 °C to about 250 °C;

passing the waste plastic pyrolysis oil through at least one guard bed configured to adsorb chlorine components when present in the waste plastic pyrolysis oil;

providing a hydrocarbon stream having a second boiling point ranging from about 30 °C to about 250 °C;

combining the hydrocarbon stream with the waste plastic pyrolysis oil to provide a combined feed stream that comprises about 2 to about 20 wt. % of the waste plastic pyrolysis oil; and feeding the combined feed stream, along with steam, to a fluid catalytic cracking unit comprising a catalytic cracking catalyst comprising a HZSM-5 zeolite, to yield a hydrocarbon product stream comprising a mixture of gaseous C1-C4 olefins and liquid C5 and C5+ hydrocarbons.

2. The process of claim 1, further comprising passing the waste plastic pyrolysis oil through at least one guard bed configured to adsorb one or more of silicon, fluorine, bromine, phosphorus, or sulphur containing components when present in the waste plastic pyrolysis oil.

3. The process of claim 1, wherein the HZSM-5 zeolite comprises about 5 weight percent (wt. %) of $P_2O_5$ and comprises a silica-to-alumina molar ratio ranging from about 27 to about 50.

4. The process of claim 1, wherein the catalytic cracking catalyst comprises a form of spray dried microspheres having an average particle size ranging from about 80 to about 110 microns.

5. The process of claim 1, wherein the combined feed stream comprises from about 10 to about 20 wt. % of the waste plastic pyrolysis oil.

6. The process of claim 1, wherein the fluid catalytic cracking unit is operated at a reaction temperature between about 600 °C and about 700 °C.

7. The process of claim 1, wherein a ratio of the steam to the waste plastic pyrolysis oil by weight is ranging from about 0.1 to about 0.5.

8. The process of claim 1, wherein the hydrocarbon product stream comprises at least about 50 wt. % of a mixture of ethylene, propylene, benzene, toluene, and xylene, based on a total weight of the hydrocarbon product stream.

9. The process of claim 1, wherein the hydrocarbon product stream comprises at least about 20 wt. % of a mixture of ethylene and propylene.

10. The process of claim 9, wherein product yields of ethylene and propylene of the hydrocarbon product stream are obtained that are substantially the same as those obtained by steam cracking an additional hydrocarbon stream that does not include the waste plastic pyrolysis oil.

11. The process of claim 1, wherein the waste plastic pyrolysis oil has not been hydrotreated.

12. The process of claim 1, further comprising:

preparing the HZSM-5 zeolite by:

calcination of a ZSM-5 zeolite, production of a slurry with the calcined ZSM-5 zeolite, the slurry formation comprises demineralized water, phosphate, alumina, nitric acid, clay, and aluminum chlorohydrate, spray drying of the slurry to produce particles with an average particle size range from about 80 to about 110 microns, calcination of the particles to produce catalyst particles with an average bulk density of 0.8 g/ml, and treatment of the catalyst particles in presence of steam, and providing the equilibrated catalyst particles to the fluid catalytic cracking unit.

13. A process for producing light olefins and aromatics, the process comprising:

providing a waste plastic pyrolysis oil having a first boiling point ranging from about 30 °C to about 250 °C;

providing a hydrocarbon stream having a second boiling point ranging from about 30 °C to about 250 °C;

combining the hydrocarbon stream with the waste plastic pyrolysis oil to provide a combined feed stream comprising from about 2 to about 20 wt. % of the waste plastic pyrolysis oil; and steam cracking the combined feed stream in a fluid catalytic cracking unit comprising a catalytic cracking catalyst with a HZSM-5 zeolite, to yield a hydrocarbon product stream comprising a mixture of gaseous C1-C4 olefins and liquid C5 and C5+ hydrocarbons.

14. The process of claim 13, further comprising passing the waste plastic pyrolysis oil through a guard bed configured to adsorb one or more of chlorine, silicon, fluorine, bromine, phosphorus, or sulphur containing components when present in the waste plastic pyrolysis oil.

15. The process of claim 13, wherein the hydrocarbon product stream comprises at least about 50 wt. % of a mixture of ethylene, propylene, benzene, toluene, and xylene, based on a total weight of the hydrocarbon product stream.

16. The process of claim 13, wherein the combined feed stream comprises from about 10 to about 20 wt. % of the waste plastic pyrolysis oil.

17. A system for producing light olefins and aromatics, the system comprising:

at least one guard bed configured to adsorb chlorine components from a waste plastic pyrolysis oil, wherein the waste plastic pyrolysis oil has a first boiling point ranging from about 30 °C to about 250 °C;

a mixer configured to combine the waste pyrolysis oil with a hydrocarbon stream to provide a combined feed stream, wherein the hydrocarbon stream has a second boiling point ranging from about 30 °C to about 250 °C; and a catalytic cracking unit configured to crack the combined feed stream with steam to yield a hydrocarbon product stream containing a mixture of gaseous C1-C4 olefins and liquid C5 and C5+hydrocarbons, wherein the catalytic cracking unit comprises a catalyst comprising a HZSM-5 zeolite.

18. The system of claim 17, wherein the combined feed stream comprises from about 2 to about 20 wt. % of the waste plastic pyrolysis oil.

19. The system of claim 17, further comprising:

a second guard bed configured to adsorb one or more of silicon, fluorine, bromine, phosphorus, or sulphur containing components from the waste plastic pyrolysis oil.

20. The system of claim 17, wherein the combined feed stream comprises a substantially homogeneous mixture.

* * * * *